US010295373B2

(12) United States Patent
Mehnert et al.

(10) Patent No.: US 10,295,373 B2
(45) Date of Patent: May 21, 2019

(54) MAGNETIC ABSOLUTE POSITION SENSOR HAVING A WIEGAND MODULE

(71) Applicant: Avago Technologies International Sales Pte. Limited, Singapore (SG)

(72) Inventors: Walter Mehnert, Ottobrunn (DE); Thomas Theil, Feldafing (DE)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/609,398

(22) Filed: May 31, 2017

(65) Prior Publication Data

US 2017/0343385 A1 Nov. 30, 2017

(30) Foreign Application Priority Data

May 31, 2016 (DE) .................. 10 2016 209 497
Jul. 22, 2016 (DE) .................. 10 2016 213 528
Mar. 7, 2017 (DE) .................. 10 2017 203 676

(51) Int. Cl.
*G01D 5/20* (2006.01)
*G01D 3/00* (2006.01)

(52) U.S. Cl.
CPC ............. *G01D 5/2013* (2013.01); *G01D 3/00* (2013.01)

(58) Field of Classification Search
USPC ........................................................ 324/207
See application file for complete search history.

(56) References Cited

U.S. PATENT DOCUMENTS

| 2010/0052663 | A1* | 3/2010 | Mehnert | ............ | G01D 5/24428 |
| | | | | | 324/207.25 |
| 2011/0184591 | A1 | 7/2011 | Mehnert et al. | | |
| 2012/0268109 | A1 | 10/2012 | Mehnert et al. | | |
| 2013/0317761 | A1* | 11/2013 | Mehnert | ................. | G01F 3/227 |
| | | | | | 702/45 |
| 2014/0067301 | A1* | 3/2014 | Mehnert | ................. | G01D 5/145 |
| | | | | | 702/78 |
| 2015/0130450 | A1* | 5/2015 | Gehringer | ............. | G01D 5/145 |
| | | | | | 324/207.25 |

FOREIGN PATENT DOCUMENTS

DE   102007039051 A1   2/2009
DE   102011002179 A1   10/2012

* cited by examiner

*Primary Examiner* — Jay Patidar
(74) *Attorney, Agent, or Firm* — Sheridan Ross P.C.

(57) ABSTRACT

A position sensor is disclosed for determining the number of repeating courses of movement of an object and of the precise position of the object in relation to a reference position. The position sensor is disclosed to include a Wiegand module, which is composed of a Wiegand wire having a coil that surrounds the Wiegand wire; a magnetic temporary storage, which is in addition to the Wiegand module; a first sensor element and a second sensor element; a processing electronic circuit, which is configured to evaluate or to determine an output signal that is output by the sensor elements and an information that is stored in the magnetic temporary storage; and a permanent magnet arrangement, which is movable relatively to the Wiegand module in one direction as well as in a direction that is opposite to said one direction.

8 Claims, 2 Drawing Sheets

MAGNETIC ABSOLUTE POSITION SENSOR HAVING A WIEGAND MODULE

CROSS-REFERENCE TO RELATED APPLICATIONS

This application claims the benefit of the filing dates of the German patent application no. DE 10 2016 209 497.1 filed May 31, 2016, of the German patent application no. DE 10 2016 213 528.7 filed Jul. 22, 2016 and of the German patent application no. DE 10 2017 203 676.1 filed Mar. 7, 2017, the disclosures of which are hereby incorporated herein by reference.

FIELD OF THE INVENTION

The present invention relates to a magnetic absolute position sensor, in particular a position sensor for determining the number of repeating courses of movement of an object and the precise posture (or position) of the object in relation to a reference posture.

TECHNOLOGICAL BACKGROUND

From the state of the art, a magnetic absolute position sensor is known from the documents DE 10 2007 039 051 A1 and DE 10 2011 002 179 A1.

The document DE 10 2007 039 051 A1 describes a rotatory absolute position sensor, which is capable to determine on the one hand an angular posture of a permanent magnet and, on the other hand, to count a number of revolutions of the permanent magnet as well as to store a value, which corresponds to said number, in a non-volatile memory. The absolute posture of the permanent magnet may be detected from the value, which corresponds to said number, and the current angular posture.

If an outside energy supply is at least temporarily not available, the described sensor is capable to continuously keep counting the number of revolutions and to store the number in the non-volatile memory. The sensor receives the energy, which is necessary for this, from a Wiegand module, which provides voltage impulses in defined temporary intervals as a function of the frequency of the revolutions of the permanent magnet, wherein the voltage impulses are used, beside the energy supply, for counting the revolutions.

As long as the outside energy supply is not available, the angular posture of the permanent magnet is not determined.

If the outside energy supply is switched on again and/or if it is available again, the angular posture of the permanent magnet may be determined immediately.

For obtaining the absolute position of the permanent magnet again, it is necessary to synchronize the value, which is stored in the non-volatile memory, with the angular posture.

In this connection, the following difficulty exists.

If, after the generation of the voltage impulse by the Wiegand module, a change of the movement direction of the permanent magnet is effected, the risk exists that the next voltage impulse, which would have to occur regularly, is rudimentary, and therefore is not recognized. If, afterwards, the sensor and/or the permanent magnet comes to a standstill in a particular (unfavourable) angular range, and if the outside energy is switched off, a synchronization and a resumption of the operation of the sensor cannot be performed reliably upon re-establishment of the outside energy supply, because there is no unambiguity (or uniqueness) about via which way (or path) the permanent magnet has come to its last posture.

The developed ambiguity could be lifted by further moving the permanent magnet further, and by sensing the next voltage impulse produced by the Wiegand module. However, it is not always possible to move the permanent magnet further. In this case, it is necessary to find out in another way via which way (or path) the permanent magnet has come to its current posture, in order to establish an error-free position sensor.

In this connection, the patent document DE 10 2011 002179 A1 proposes to evaluate the magnetization direction of the Wiegand wire in order to obtain information about the path of movement.

This is performed, on the one hand, by a magnetic sensor, which is arranged in the vicinity of the Wiegand wire, and which detects the magnetization direction of the Wiegand wire.

On the other hand, the possibility exists to supply the coil, which is wound around the Wiegand wire, with current, in order to achieve a reversal of magnetism of the Wiegand wire, and to evaluate the strength of current, which is necessary for this.

However, both variants have disadvantages.

The remanence (or residual magnetism) of the Wiegand wire is very small, such that the magnetic sensor has to be very precise in order to be able to detect the magnetization direction of the Wiegand wire.

In contrast, the supply of the coil, which is wound around the Wiegand wire, with current causes additional component parts and thus costs.

SUMMARY OF THE INVENTION

In front of this background, there may be a need to provide an absolute position sensor, which can be synchronized easily and efficiently.

According to an embodiment example of the present invention, there is provided an absolute position sensor according to the patent claim 1. Further embodiment examples of the invention are described in the dependent claims.

According to an aspect of the present invention, a position sensor according to the invention, which may be for determining the number of repeating courses of movement of an object and the precise posture of the object in relation to a reference posture, may comprise the following:

a Wiegand module, which may be composed of a Wiegand wire that may have a coil that may surround the Wiegand wire;

a magnetic temporary storage, which may be in addition to the Wiegand module;

a first sensor element;

a processing electronic circuit, which may be configured to evaluate or to determine an output signal that is output from the first sensor element and an information that may be stored in the magnetic temporary storage; and a permanent magnet arrangement, which may be movable relatively to the Wiegand module in one direction as well as in a direction that may be opposite to said one direction, wherein the permanent magnet arrangement may be configured to be arranged at the object such that the permanent magnet arrangement may perform the repeating courses of movement together with the object; wherein:

upon movement of the permanent magnet arrangement in said one direction, the coil of the Wiegand module may generate a voltage impulse, if a north pole or a south pole of the permanent magnet arrangement may be located at a first position, and, upon movement of the permanent magnet arrangement in said opposite direction, the coil of the Wiegand module may generate the voltage impulse, if the north pole or the south pole of the permanent magnet arrangement may be located at a second position that is different from the first position.

The number of repeating courses of movement of the object, which may be determined by the position sensor, may correspond preferably to the number of repeating revolutions of the object.

The permanent magnet arrangement may have one or more magnets—generally stated 2n magnets (wherein n=1, 2, 3, . . . , m).

It is believed that by the relative movement of the permanent magnet arrangement with respect to the Wiegand module, there may be effected a change of the magnetic field of the permanent magnet arrangement as sensed by the Wiegand module. The Wiegand wire, which may preferably be manufactured from Vicalloy, may be formed in particular/advantageously of a soft-magnetic core having a hard-magnetic shell. This implementation may result in a physical characteristics of the Wiegand module and/or of the Wiegand wire to the effect that a sudden change of the orientation of the Weiß domains/magnetic domains of the Wiegand wire (macroscopic Barkhausen effect) is believed to be effected as from a particular amplitude of the magnetic field. This change may lead in turn to the generation of the voltage impulse in the coil of the Wiegand module. As a function of in which direction the permanent magnet arrangement moves, i.e. in said one direction or in the direction that is opposite to said one direction, the north pole or the south pole of the permanent magnet arrangement may be located at the mentioned first or second position upon generation of the voltage impulse. The mentioned voltage impulse may be obtained in particular/advantageously, if—starting from a state, in which the core and the shell have the same magnetic orientation—the Weiß domains/magnetic domains of the soft-magnetic core change their direction abruptly upon reaching the amplitude of the magnetic field. Upon a further movement of the permanent magnet arrangement in the same direction, it believed that there is also effected an according change of the Weiß domains/magnetic domains of the hard-magnetic shell due to the further increase of the amplitude. However, the impulse, which may thereby be generated, may be much smaller and advantageously is not evaluated.

Generally stated, a Wiegand wire may preferably be understood to be a wire, which may have a hard-magnetic shell and a soft-magnetic core, or preferably a soft-magnetic shell and a hard-magnetic core, wherein in the intended use of the position sensor according to the invention the wire may preferably be operated bipolarly/symmetrically, i.e. the Weiß domains/magnetic domains of both the shell and the core are believed to change their orientations by a change of the amplitude and orientation of the magnetic field of the permanent magnet arrangement.

Upon movement of the permanent magnet arrangement, the magnetic poles of the permanent magnet arrangement may come to pass by the magnetic temporary storage, such that the magnetic temporary storage may store information, which may indicate, whether the north pole or the south pole of the permanent magnet arrangement may have lastly come to pass the magnetic temporary storage.

In an autonomous mode, in which the position sensor may not be supplied with outside energy, the processing electronic circuit may be provided with energy, which may be provided by the Wiegand module.

The energy, which may be provided by the Wiegand module, may be temporarily stored in an energy storage, preferably in a capacitor. The energy storage in turn may supply the processing electronic circuit with the correspondingly stored energy.

The processing electronic circuit may be configured to, after the determination of the voltage impulse, which may output by the Wiegand module, determine a value, which may correspond to the number of repeating courses of movement of the permanent magnet arrangement, namely by the evaluation of the output signal of the first sensor element.

If, for example, the processing electronic circuit determines by the evaluation of the output signal of the first sensor element, after the detection of the voltage impulse, that one of the magnetic poles of the permanent magnet arrangement is located at the first position, then, due to the functionality of the Wiegand wire, it may be concluded from this that the permanent magnet arrangement may move in said one direction. However, if the processing electronic circuit determines, after detecting the voltage impulse, that one of the magnetic poles of the permanent magnet arrangement is located at the second position, it may be concluded from this that the permanent magnet arrangement may move in the direction that is opposite to said one direction. Thus, on the basis of the output signal of the first sensor element, the processing electronic circuit may be capable to obtain direction information about whether the permanent magnet arrangement moves in said one direction or in said opposite direction The processing electronic circuit, after the detection of the voltage impulse, may be capable to obtain, in addition, magnetic pole information whether the north pole or the south pole of the permanent magnet arrangement is located at the first position or the second position. This magnetic pole information may be obtained by an evaluation of the output signal of the first sensor element or by a determination of the polarity of the voltage impulse, which may be generated by the coil of the Wiegand module.

The processing electronic circuit may determine the number of repeating courses of movement on the basis of the obtained direction information and magnetic pole information. The according value may preferably be stored in a data storage.

The resolution of the number of repeating courses of movement may depend on the number of the permanent magnets and/or of the magnetic poles of the permanent magnet arrangement. If the above-mentioned parameter n=1, then the resolution may be 0.5. Upon increase of the parameter n, the resolution may increase accordingly.

Preferably, the processing electronic circuit may be configured to determine the number of repeating courses of movement direction-dependently (or as a function of the movement direction). That is, a sign may be assigned to said one direction and to said opposite direction, such that the direction information, which may be obtained by the processing electronic circuit, may be subject to a sign (or is signed) and the number of repeating courses of movement may either be increased or reduced as a function of the direction, in which the permanent magnet arrangement may move.

Alternatively or additionally, the processing electronic circuit may be configured to determine the amount of the repeating courses of movement direction-independently (or independently of the movement direction). That is, the direction information, which may be obtained by the processing electronic circuit, may not be signed (may not be assigned a sign), such that the number of repeating courses of movement may be increased independently from the direction, in which the permanent magnet arrangement may move.

In a non-autonomous mode, in which the position sensor may be supplied with outside energy, the processing electronic circuit may further be configured to obtain continuously posture information about the precise posture of the permanent magnet arrangement in relation to the reference posture, to combine the posture information with the determined value, and to output the combined information, namely by the evaluation of the output signal of either the first sensor element or of a second sensor element.

The first sensor element may be embodied such that its output signal may be evaluated both for determining the value, which may indicate the number of repeating courses of movement, and also for determining the posture information about the precise posture. For example, in this case, the first sensor element may concern GMR and/or AMR elements, which may provide, preferably simultaneously, two sinus signals which may be phase-shifted to one another (e.g. a sinus signal and a cosine signal), or at least two Hall elements, which also may provide, preferably simultaneously, sinus signals, which may also be phase-shifted to one another (e.g. sinus signal and cosine signal).

Alternatively to this, the first sensor element may exclusively serve for the determination of the value, which may indicate the number of repeating courses of movement, and the second sensor element may exclusively serve for the determination of the posture information about the precise posture. In this case, the first sensor element may concern, for example, one single Hall element, a plurality of Hall elements, or an additional coil that may additionally be wound around the Wiegand wire. In this case, the second sensor element may concern sensor elements, which may be known from the state of the art, such as for example: (i) optical sensor elements, (ii) inductive sensor elements, (iii) capacitive sensor elements, and (iv) resistive sensor elements.

The continuous posture information about the precise posture of the permanent magnet arrangement may be determined by the output signal of the first or the second sensor element. Thus, the corresponding sensor element may serve for the fine resolution of the position sensor.

The continuous posture information about the precise posture of the object may be obtained, if the position sensor is [operating] in the non-autonomous mode, in which the corresponding sensor element is supplied with the outside energy.

The position sensor according to the invention may be considered to be an absolute position sensor for the reason, because, even upon a discontinuation of the outside energy supply, it may be capable to further determine the value of the number of repeating courses of movements, and, after the external energy supply may be available again, it may be configured to determine the absolute position of the permanent magnet arrangement from the determined value and the current precise posture of the permanent magnet arrangement in relation to the reference posture.

If the outside energy supply is re-established again after a discontinuation, the combining of the posture information with the determined value may be effected by taking into consideration the information, which may be stored in the magnetic temporary storage.

If the position sensor according to the invention is [operating] in the autonomous mode, and particular courses of movement of the permanent magnet arrangement show up, the case may occur that the Wiegand module provides rudimentary voltage impulses.

If, after a rudimentary voltage impulse, the position sensor according to the invention transitions into the non-autonomous mode, the permanent magnet arrangement may be located in postures, which it could reach via different paths (or ways).

For determining this path (or way), the information, which may be stored in the magnetic temporary storage and which may indicate, which one of the magnetic poles of the permanent magnet arrangement may lastly have come to pass the magnetic temporary storage, thus in which direction the permanent magnet arrangement may have moved in order to come to its current posture, may be used.

When taking into consideration the information, which may be stored in the magnetic temporary storage, the combining of the posture information with the value of the number of repeating courses of movement can be performed error-freely.

Further preferably, the information, which may be stored in the magnetic temporary storage, is stored as a single bit.

Further preferably, the magnetic temporary storage may be magnetized in one of two magnetization states as a function of whether the north pole or the south pole of the permanent magnet arrangement may lastly have come to pass the magnetic temporary storage.

The magnetization state of the magnetic temporary storage may reliably indicate, which magnetic pole of the permanent magnet arrangement may lastly have come to pass magnetic temporary storage. The magnetization state of the magnetic temporary storage may be preserved as long as the other magnetic pole of the permanent magnet arrangement may not have come to pass the magnetic temporary storage and thus may not have changed the magnetization state.

Further preferably, the magnetic temporary storage may be read out by a Hall element that may be connected to the processing electronic circuit.

The Hall element may be spatially arranged relatively to the magnetic temporary storage such that it may be capable to detect the magnetization state of the magnetic temporary storage.

Further preferably, the magnetic temporary storage may be a metal element.

Preferably, the metal element may be a ferromagnetic element, which may be made, for example, from iron, nickel or cobalt. The magnetic temporary storage may thus be a simple, cost-efficient and reliable component part, which can be realized easily.

Further preferably, the material, from which the metal element may be made, may have a remanence (or residual magnetism), which may be higher than that of the Wiegand wire.

Further preferably, the processing electronic circuit may comprise the first sensor element, the second sensor element, the magnetic temporary storage, and a micro-controller for determining the posture information.

Furthermore, the following can be said about the sensor elements.

The first sensor element is, for example, an additional coil, which may additionally surround the Wiegand wire, and the processing electronic circuit may be configured to obtain the direction information by evaluating a temporal occurrence of the output signal of the additional coil in relation to the voltage impulse.

In particular, the additional coil may be spatially offset in relation to the coil of the Wiegand module.

The processing electronic circuit may be configured to evaluate the temporal occurrence of the output signal and/or of the voltage impulse of the additional coil with respect to the voltage impulse of the coil of the Wiegand module, and to determine on the basis of this, whether the permanent magnet arrangement moves in said one direction or in the direction that is opposite to said one direction.

The processing electronic circuit may obtain the magnetic pole information by evaluating either the polarity of the voltage impulse of the coil of the Wiegand module or the polarity of the voltage impulse of the additional coil.

Alternatively, the first sensor element may be at least a first Hall element, wherein the first Hall element may be arranged such that the processing electronic circuit may obtain the direction information by the evaluation of the output signal of the first Hall element.

As has been explained above, it is believed that the magnetic domains of the Wiegand wire abruptly change their orientation, if (i) the permanent magnet arrangement may move in said one direction and one of the magnetic poles of the permanent magnet arrangement may reach the first position, or if (ii) the permanent magnet arrangement may move in the direction that may be opposite to said one direction, and one of the magnetic poles of the permanent magnet arrangement may reach the second position.

The arrangement (positioning) of the first Hall element may preferably be selected such that, after the determination of the voltage impulse of the Wiegand module, the first Hall element (i) may provide no output signal, if the permanent magnet arrangement may move in said one direction, and one of the magnetic poles of the permanent magnet arrangement may be located at the first position, and (ii) may provide an output signal, if the permanent magnet arrangement may move in the direction that may be opposite to said one direction, and one of the magnetic poles of the permanent magnet arrangement may be located at the second position.

Alternatively, the first Hall element may also be arranged such that, after the detection of the voltage impulse, it may still provide an output signal independently of the direction, in which the permanent magnet arrangement may move. In this case, for the obtainment of the direction information, the processing electronic circuit may evaluate the output signal of the first Hall element in that it may put in relation the magnetic pole, which may be recognized by the first Hall element with the polarity of the voltage impulse.

Particularly preferably, the first sensor element may contain a second Hall element, wherein the first Hall element and the second Hall element may be arranged such that the processing electronic circuit (i) may redundantly obtains the direction information by the evaluation of the output signal of the first Hall element and the output signal of the second Hall element, and (ii) may redundantly obtain the magnetic pole information by the determination of the polarity of the voltage impulse that may be generated by the coil of the Wiegand module, by the evaluation of the output signal of the first Hall element, and by the evaluation of the output signal of the second Hall element.

As has been mentioned already, the first and the second Hall element may also serve in addition for the determination of the position information about the precise posture of the permanent magnet arrangement.

The Hall elements and the processing electronic circuit (except for the magnetic temporary storage, if this is formed from the simple metal element) may preferably be integrated together in a common integrated circuit on a measurement substrate, wherein the integrated circuit may be based either on a uniform integration technology, for example the CMOS technology, or on different integration technologies, for example the CMOS and the FRAM technology.

Particularly preferably, the magnetic temporary storage (and preferably also the corresponding Hall element provided for reading out the temporary storage) may be arranged such that the magnetic temporary storage may not impair the sensor element provided for the determination of the precise posture and/or may not generate an interference field (or noise field) for the determination of the precise posture of the permanent magnet arrangement. To this end, the temporary storage and the corresponding Hall element may also be arranged on a separate, correspondingly remote chip.

In the autonomous mode, the first and the second Hall element and the processing electronic circuit may be supplied with energy, which may be provided by the Wiegand module.

The first Hall element and the second Hall element may be arranged such that the processing electronic circuit may obtain, by the evaluation of the output signal of the first Hall element and the output signal of the second Hall element, at least redundant direction information about whether the permanent magnet arrangement moves in said one direction or in said opposite direction.

The processing electronic circuit may evaluate the output signals of the Hall elements for the obtainment of the redundant direction information preferably by comparing the output signals and/or output voltages of the Hall elements with corresponding fixed voltage thresholds.

Preferably, the first Hall element and the second Hall element may be arranged such that the processing electronic circuit obtains, by the evaluation of the voltage impulse of the Wiegand module, the output signal of the first Hall element and the output signal of the second Hall element, redundant direction and magnetic pole informations about whether the north or south pole may be located at the first or second position, and whether the permanent magnet arrangement may move in said one direction or in said opposite direction.

The mentioned redundant direction and magnetic pole informations may be obtained by the processing electronic circuit in particular if the first Hall element and the second Hall element are arranged such that they output output signals, which may be of different height (according to their amount, in their signal strength), as a function of whether, after the detection of the voltage impulse, the north or the south pole may be located at the first or at the second position.

Particularly preferably, the first Hall element may be arranged corresponding according to the first position and the second Hall element may be arranged corresponding to the second position.

Stated differently, the first Hall element, upon movement of the permanent magnet arrangement in said one direction, may output an output signal, which may correspond to the north pole or to the south pole upon occurrence and/or after the detection of the voltage impulse of the Wiegand module, whereby the second Hall element may not output an output signal upon occurrence and/or after the detection of the voltage impulse. Upon a reversal of the movement direction of the permanent magnet arrangement, i.e. if the permanent magnet arrangement moves in said opposite direction, the second Hall element may output an output signal, which may correspond to the north pole or to the south pole upon occurrence and/or after detection of the voltage impulse, whereby the first Hall element may not provide an output signal upon occurrence and/or after detection of the voltage impulse.

The redundant direction information with respect to the movement direction of the permanent magnet arrangement may be obtained by the processing electronic circuit by evaluating the different output signals of the Hall elements, whereas the redundant magnetic pole information with respect to the polarity of the permanent magnet arrangement, i.e. whether the north pole or the south pole is located at the first or at the second position, may be obtained by the processing electronic circuit by the output signal of the Hall element assigned to the corresponding position and by the polarity of the voltage impulse, which may be output by the Wiegand module.

Alternatively, the mentioned redundant direction and magnetic pole informations may be obtained in particular by the processing electronic circuit, if the first Hall element and the second Hall element are arranged such that they output output signals of a same height (according to their amount, in their signal strength) as a function of whether the north pole or the south pole is, after the detection of the voltage impulse, located at the first or at the second position.

In this case, the processing electronic circuit may evaluate the output signals of the first and the second Hall element for the obtainment of the redundant direction information in that it puts the magnetic pole, which may have been recognized by the first Hall element, in relation with the polarity of the voltage impulse, and likewise the magnetic pole, which may have been recognized by the second Hall element, may be put in relation with the polarity of the voltage impulse.

The redundant magnetic pole information may be obtained by the evaluation of the output signals of the first and/or of the second Hall element and the polarity of the voltage impulse which may be output from the Wiegand module.

DETAILED DESCRIPTION OF EXEMPLARY EMBODIMENTS

In the following, preferred embodiments of the invention are described with reference to the appended drawings.

FIG. 1 shows a perspective view of a preferred embodiment of a position sensor 1000 according to the invention.

The position sensor 1000 may comprise a Wiegand module 1100, which may have, on one hand, a Wiegand wire 1101 and, on the other hand, a coil (not shown) which may be wound and/or runs around the Wiegand wire 1101, and a permanent magnet arrangement 1200, which may be composed of a rectangular permanent magnet 1201 in this preferred embodiment. The permanent magnet 1201 may also be cylindrical or may have any other regular shape.

The permanent magnet arrangement 1200 may be rotatably supported such that a north pole N and a south pole S of the permanent magnet arrangement 1200 may rotate (or revolve) about a rotation axis DA. The rotation direction may either be in one direction, for example the clockwise direction, or in a direction that may be opposite to said one direction, the counter-clockwise direction. In an intended use of the position sensor 1000, the permanent magnet arrangement 1200 may be fixed to a rotating object to be monitored, such that the rotation axis DA of the permanent magnet arrangement 1200 may correspond to the rotation axis of the object and the permanent magnet arrangement 1200 may thus rotate together with the object to be monitored.

The Wiegand wire 1101 may be composed of a soft-magnetic core and a hard-magnetic shell. Upon rotation of the permanent magnet arrangement 1200, the domains and/or Weiß domains of the Wiegand wire 1101 are believed to abruptly change their orientation as from a particular change and/or rotation of the magnetic field, whereby as a result of this, a voltage impulse may be effected, which may be generated by the coil that may be wound around the Wiegand wire 1101. Due to the formation of the Wiegand wire 1101 from a soft- and a hard-magnetic portion (core and shell), the abrupt change of the orientation of the domains may be effected, as a function of the rotation direction of the permanent magnet arrangement 1200, in different postures (or positions) of the permanent magnet arrangement 1200.

If, starting from a posture, in which a longitudinal axis of the rectangular permanent magnet may be oriented parallel to a longitudinal axis LAW of the Wiegand module 1100, the permanent magnet arrangement 1200 may rotate, for example in the clockwise direction, the abrupt change of the orientation of the domains may result after a rotation of the rectangular-shaped permanent magnet 1201 about ca. 135°. In this posture of the permanent magnet 1201, either the corresponding north pole N or the south pole S may be located at a first position.

On the contrary, if, starting from the explained starting posture, the permanent magnet arrangement 1200 may rotate in the counter-clockwise direction, the abrupt change of the orientation of the domains may result after a rotation of the rectangular-shaped permanent magnet 1201 about ca. 135°, whereby in this posture of the permanent magnet 1201, the north pole N or the south pole S may be located at a second position, which may be different from the first position.

Figure 1:
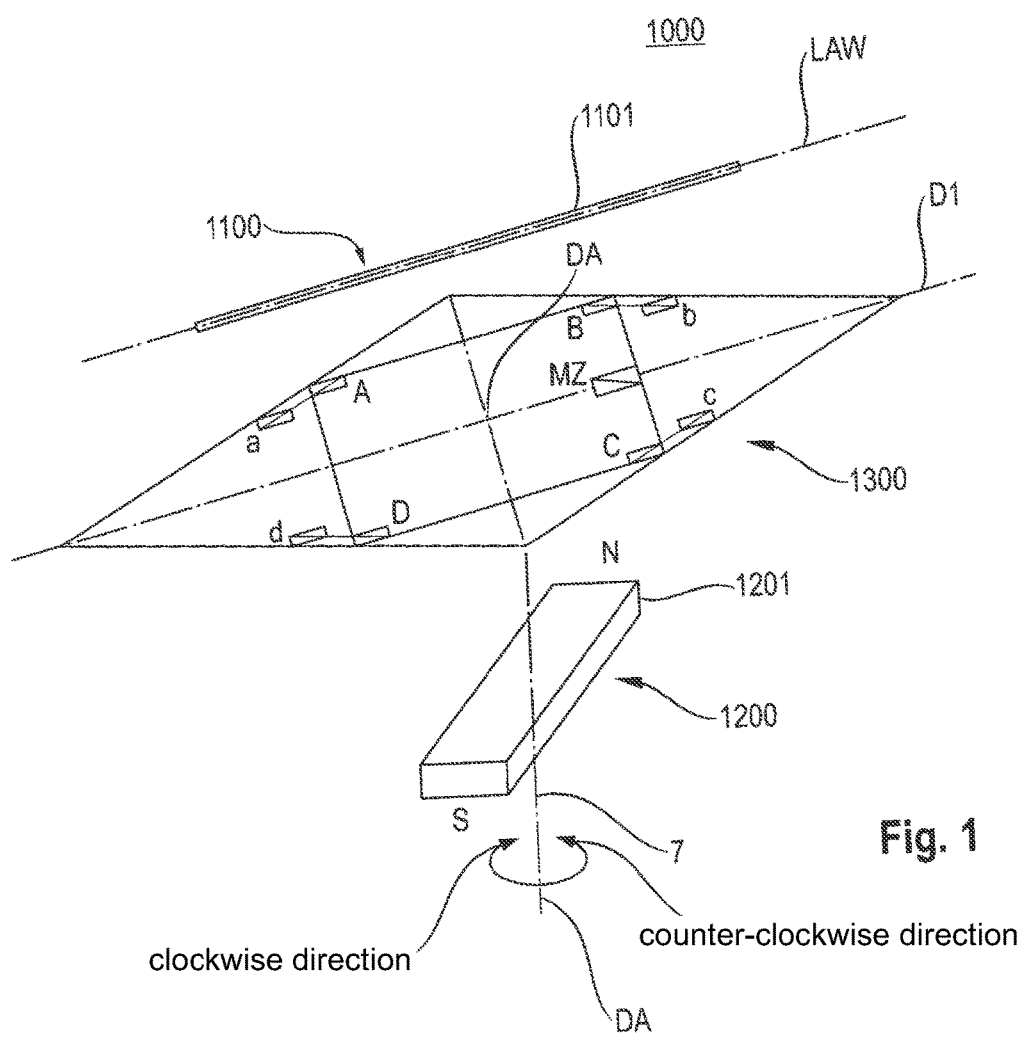
FIG. 1 shows a perspective view of an absolute position sensor according to the invention according to a preferred embodiment of the invention, wherein the position sensor is embodied such that it is capable to detect an absolute position (or posture) of a rotating permanent magnet.

Beside the Wiegand module 1100 and the permanent magnet arrangement 1200, the position sensor 1000 according to the invention and according to the preferred embodiment of the invention may further comprise a measurement substrate 1300, which may preferably have a square shape. As can be seen in FIG. 1, the measurement substrate 1300 may be arranged between the Wiegand module 1100 and the permanent magnet arrangement 1200, wherein the measurement substrate 1300 may be in a measurement plane, which may extend preferably parallel to the movement plane, in which the rectangular-shaped permanent magnet 1201 may rotate and/or which may stand perpendicular to the rotation axis.

A plurality of Hall elements a to d (first sensor elements), a further plurality of Hall elements A to D (second sensor elements), and a magnetic temporary storage MZ may be arranged on the measurement substrate 1300.

The plurality of Hall elements a to d, the further plurality of Hall elements A to D, and the magnetic temporary storage MZ are well visible in the perspective view according to FIG. 1.

Each one of the Hall elements A to D may be located, respectively, both at an outer edge of the measurement substrate 1300 and also at a center of an edge of the corresponding outer edge of the measurement substrate 1300.

In addition, the Hall elements A to D, which may be formed quadrangular, may be twistedly arranged at the center of an edge such that a diagonal, which may connect two corners of the respective Hall element, may stand perpendicular to the corresponding outer edge.

The magnetic temporary storage MZ may preferably be arranged on the measurement substrate 1300 on a diagonal D1 between the Hall elements B and C.

The Hall elements (second sensor elements) A to D may be operated in particular in a non-autonomous mode of the position sensor 1000, in which the position sensor 1000 may be supplied with outside energy (or external energy), and their output signals may be output to a micro-controller 3100, which may be a part of the processing electronic circuit, and which may still not have to be explained in the following. On this basis, the micro-controller may calculate the precise angular posture (posture information) of the permanent magnet arrangement 1200 and/or of the object in relation to a reference posture. In this respect, the Hall elements A to D may be used for the fine resolution.

Furthermore, in the non-autonomous mode not only the precise angular posture of the permanent magnet arrangement 1200, but also the value, which may reflect the number of repeating courses of movement and/or rotations of the permanent magnet arrangement 1200, can be determined from the output signals of the second sensor elements A to D.

Beside the explained Hall elements A to D, also the Hall elements (first sensor elements) a to d may be arranged on the measurement substrate 1300, wherein the Hall elements a to d are arranged may be slightly offset to the Hall elements A to D, respectively.

In particular, in an autonomous mode, in which the position sensor 1000 may not be supplied with outside energy, the Hall elements a to d may be necessary for determining the value, which may indicate the number of rotations and/or revolutions of the permanent magnet arrangement 1200.

The output signals of the Hall elements a to d may also be used in the non-autonomous mode for determining the number of rotations and/or revolutions of the permanent magnet arrangement.

If the permanent magnet 1201 of the permanent magnet arrangement 1200 rotates about the rotation axis DA in the clockwise direction, the abrupt changes of the domains of the Wiegand wire 1101 may be effected, as has been explained above, if the north pole N or the south pole S is located at the explained first position.

As can be seen from FIG. 1, this first position may correspond, in the measurement plane, approximately to the position of the Hall element B. Stated differently, the first position and the position of the Hall element B may be located one behind the other and/or one above another in the direction of the rotation axis DA.

The Wiegand wire 1101 may also be formed from the soft- and hard-magnetic regions such that the mentioned first position, at which the north pole N or the south pole S of the permanent magnet arrangement 1200 may be located upon triggering the voltage impulse, may correspond to the position of the Hall element b in the measurement plane. Stated differently, in the first position, the north pole N or the south pole S of the permanent magnet 1201 may be located above the Hall element b.

If the permanent magnet arrangement 1200 is arranged in the posture, in which one of the poles is located at the first position, the respective other magnetic pole may stand in a same spatial relation to the Hall element d.

Upon movement of the permanent magnet arrangement 1200 in said opposite direction, i.e. upon rotation of the rectangular-shaped magnet 1201 in the counter-clockwise direction, in an equivalent manner, the abrupt change of the orientation of the domains of the Wiegand wire 1101 is believed to be effected, if the north pole N or the south pole S of the permanent magnet arrangement 1200 may be located at a second position which may be different from the first position.

Depending on the embodiment of the Wiegand wire 1101, the second position may correspond either to the Hall element c or to the Hall element C. If the north pole N or the south pole S may be located at the second position, the respective other magnetic pole may stand in a same spatial relation to the Hall element a or the Hall element A. The output signals of the Hall elements a and c may be evaluated in the same manner as those of the Hall elements b and d.

As a function of in which direction the permanent magnet arrangement 1200 may rotate, in the normal case, direction information may be obtained from the output signals of the pairs of the Hall elements a, c and b, d about whether the permanent magnet arrangement 1200 may rotate in said one direction—the clockwise direction—or in the direction that may be opposite to said one direction—the counter-clockwise direction—.

In addition, also magnetic pole information about whether the north pole N or the south pole S may be located at the first or at the second position may also be obtained from the output signals of the Hall elements a, c and b, d. Insofar, the resolution of the absolute position sensor 1000 according to the invention in the autonomous mode may be one half turn.

The direction information and magnetic pole information, which may have been obtained by the evaluation of the output signals of the Hall elements a to d, may be used to determine the value, which may reflect the number of rotations of the permanent magnet arrangement 1200.

By synchronizing and combining the value, which may reflects the number of rotations of the permanent magnet arrangement 1200, with the precise current angular posture of the permanent magnet arrangement 1200 in relation to a reference posture, a combined information, which may indicate the absolute position (or posture) of the object, can be sensed.

Theoretically, the number of the Hall elements a to d can be reduced to one single Hall element.

Figure 2:
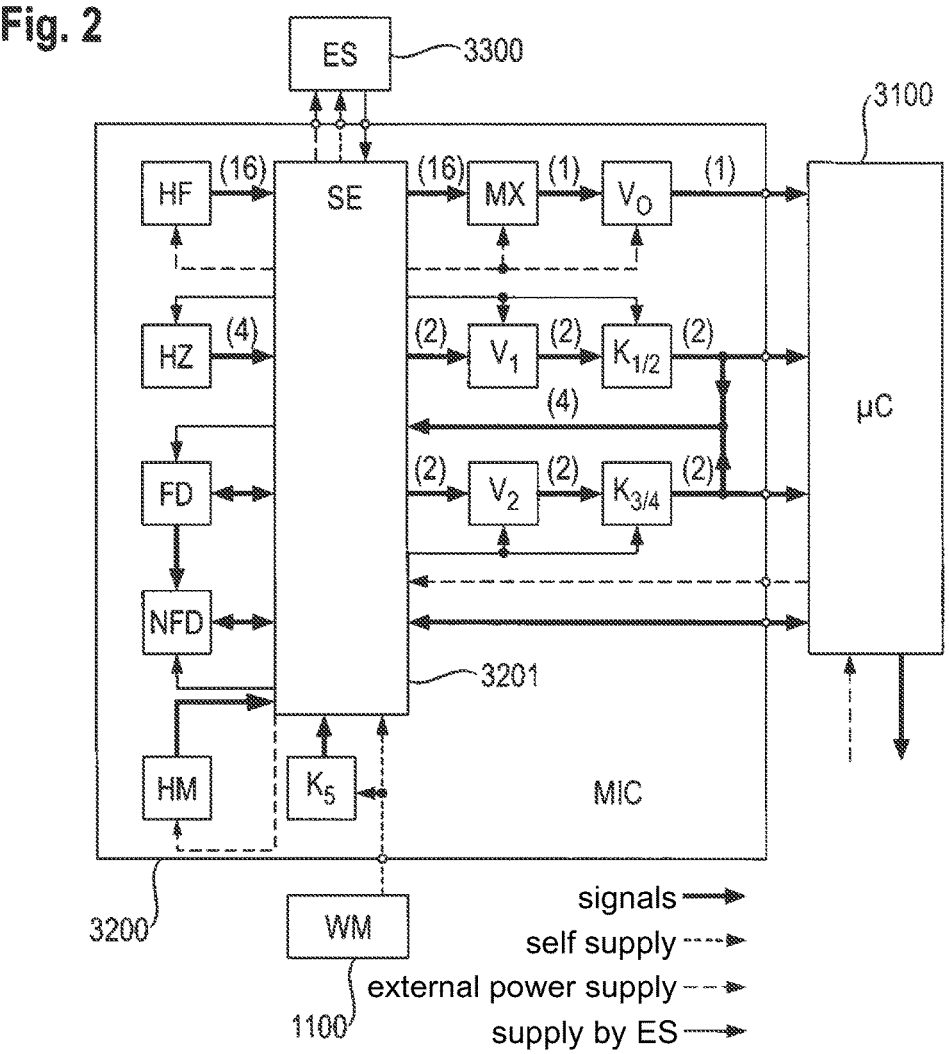
FIG. 2 shows schematically the electronic composition of the absolute position sensor according to the invention.

FIG. 2 shows schematically the composition of the processing electronic circuit of the absolute position sensor according to the preferred embodiment of the invention.

In the processing electronic circuit of FIG. 2, the Hall elements a to d, the Hall elements A to D, and a Hall element HM may be arranged such that their active areas, which may be sensitive to a magnetic field, may extend in the measurement plane.

For an elimination of interference fields and interference quantities in the output signals, the respective output signals of the first Hall elements a to d and of the second Hall elements A to D may be evaluated pair-wisely according to the difference principles. In this connection, the output signals of, for example, the Hall elements A and C may be evaluated such that the portions of the output signals, which may be based on the magnetic field components that may be oriented oppositely and that may penetrate the Hall elements A and C, add to one another, whereas the portions of the output signals, which may be based on the magnetic field components that may be oriented similarly and that may penetrate the Hall elements A and C, may subtract from one another, and thus may cancel each other. The output signals of the other Hall elements B and D, a and c, and b and d may be evaluated likewise.

All the elements, which are contained in FIG. 2 in the square 3200, which is referenced with MIC, may be arranged on the measurement substrate and may be electrically connected to a micro-controller 3100, the Wiegand module 1100 and an energy storage 3300. The elements arranged on the measurement substrate together with the micro-controller 3100 may form the processing electronic circuit of the position sensor. The Wiegand module 1100 may arranged on a printed circuit board, on which, for example, also the measurement substrate, the energy storage 3300 and the micro-controller 3100 may be arranged.

Except for the micro-controller 3100, the processing electronic circuit may be arranged completely on the measurement substrate 1300, wherein all the elements on the measurement substrate 1300 may be based on an identical integration technology. Preferably, the measurement substrate may concern a silicon substrate, on which all elements may be realized, for example, in the CMOS integration technology.

In FIG. 2, the shortly-dashed lines/arrows symbolize the course of the self-energy supply, the longly-dashed lines/arrows symbolize the course of the outside energy supply, the thin-continuous lines/arrows symbolize the course of the supply by the energy storage 3300, and the thick-continuous lines/arrows symbolize the course of the signals.

The position sensor according to the preferred embodiment may be operated either in a non-autonomous mode, in which the position sensor may be supplied with outside energy, or in an autonomous mode, in which the position sensor may be supplied with energy, which may be stored in the energy storage 3300.

The processing electronics may comprise a control electronics SE, which is connected to the Hall elements (A to D) HF for the fine resolution and via a multiplexer MX to a first amplifier V0.

(Non-Autonomous Mode)

In the non-autonomous mode, the outside energy supply may be effected via the micro-controller 3100, which may be connected to the control electronics SE for this purpose. The control electronics SE in turn may supply the Hall elements HF, the multiplexer MX and the first amplifier V0 with the received outside energy and, furthermore, may charge the energy storage ES, which may preferably be composed of one or more capacitors, with the outside energy.

In the non-autonomous mode, the control electronic SE may receive 16 signals from the second Hall elements A to D, which may be configured in this variant of the electronic circuit shown in FIG. 2 respectively with two current terminals and two Hall voltage terminals. The 16 signals may result because the second Hall elements A to D may be operated in a "spinning current" method, in which both the current terminals and the Hall voltage terminals of each Hall element A to D may be exchanged once, and, respectively, also their polarity may be changed once. Insofar, four output signals may result per Hall element A to D, which may be transferred to the control electronics SE.

The control electronics SE may output the 16 signals to an input of the multiplexer MX, which may switch the received signals, respectively selected one after another, through to its output, and may output [them] via one single line to the first amplifier V0.

The first amplifier V0 may amplify the received signal, and, after the amplification, may output it to the micro-controller 3100. In this state, the signal may still be an analog signal, wherein the micro-controller 3100 may convert this signal from analog to digital, and again may receive 16 signals for further processing via a demultiplexer.

On the basis of the received signals, the micro-controller 3100 may calculate the precise posture (posture information) of the permanent magnet arrangement in relation to a reference posture, i.e. the angular posture (or angular position) of the permanent magnet 1201.

The four Hall elements a to d, which are referred to by HZ in FIG. 2, may be supplied with energy from the energy storage ES. Since, at least in the non-autonomous mode, the energy storage ES may be charged with outside energy, the Hall elements HZ may be supplied indirectly with the outside energy.

The four Hall elements HZ may output their respective four output signals to the control electronics SE, which may process the respective two output signals of the pairs of the Hall elements according to the difference principle, and thus, in result, may obtain one signal per pair of Hall elements.

The two signals, which may be obtained in result for both pairs, are output block-wisely via a second amplifier V1 to two comparators K1/2, and block-wisely via a third amplifier V2 to two comparators K3/4. Two of the comparators may perform a comparison with a negative voltage threshold, and the other two of the comparators may perform a comparison with a positive voltage threshold, such that each signal, which may have been obtained in result according to the difference principle, may be compared with a positive and with a negative voltage threshold.

The four obtained output signals of the comparators K1 to K4 may be returned, on one hand, to the control electronics SE and, on the other hand, to the micro-controller 3100. The four obtained output signals of the comparators K1 to K4 may allow an interpretation as to in which posture the permanent magnet arrangement 1200 may be located in relation to the reference posture and/or how the magnetic poles may be oriented. The continuous evaluation of the output signals of the Hall elements, which may occur sequentially one after the other, also may allow a conclusion as to in which direction the permanent magnet arrangement 1200 may move (clockwise direction and/or counter-clockwise direction). From this, the value of the repeating courses of movements (revolutions) of the permanent magnet arrangement 1200 can be determined. This determination may be effected, on one hand, in the micro-controller 3100, and, on the other hand, in the control electronics SE, which may store this value in a volatile data storage FD and/or in a non-volatile NFD. Herein, the volatile data storage FD may be, for example, a register, which may be based on the CMOS technology. The non-volatile data storage NFD may be, for example, an EEPROM, which may also be based on the CMOS technology.

In the non-autonomous mode, the control electronics SE may also supply the Hall element HM, which may read out the magnetization state of the magnetic temporary storage MZ. The magnetic temporary storage may be, for example, a simple metal element, which may change its magnetization state, if one of the poles of the permanent magnet 1201 comes to pass by it. This may be effected by the material from which the magnetic temporary storage may be composed of, being magnetized by the magnetic pole which may come to pass, and by a residual magnetization (remanence) remaining in this material even when the pole may have moved further, due to a hysteresis in this material. Thus, the information, which may be stored in the temporary storage MZ in the form of the residual magnetisation, may indicate whether the north pole or the south pole of the permanent magnet arrangement may have lastly come to pass the magnetic temporary storage MZ. The read-out signal may be transferred, preferably as a 1-bit signal, to the control electronic SE, which in turn may forward the received signal to the micro-controller 3100.

A significant advantage of this arrangement may consist in that no auxiliary energy source may be required in the temporary storage for the storage of the necessary information, and in that the information may be available immediately after the switching-on of the outside energy supply for the correct initialization.

The micro-controller 3100, taking into consideration the signal obtained from the Hall element HM, may combine the value of the repeating courses of movement with the obtained precise posture of the permanent magnet arrangement, in order to determine the absolute and error-free combined information, and to store it and/or to output it to an application.

(Autonomous Mode)

In some applications, the case may occur that the outside energy supply may break down or is temporarily not available. In these situations, the precise posture (posture information) of the permanent magnet arrangement, i.e. the angular position, may be of sub-ordinate relevance, and may not be determined. However, care may have to be be taken in these situations, that the value, which may indicate the number of the repeating courses of movement (revolutions) may be continuously sensed and stored, such that the value may be available again upon re-establishment of the outside energy supply, and may be combined with the posture information.

If the outside energy supply breaks down and/or is not available, the Hall element HM, the four Hall elements HF, the multiplexer MX, and the amplifier V0 may not be operated.

In the autonomous mode, the Wiegand module 1100, which may provide voltage impulses as a function of the velocity of the permanent magnet arrangement in a corresponding frequency, may take over the energy supply.

In the autonomous mode, the control electronic SE may take over the control and the management of the energy supply of the processing electronic circuit, for example, by rectifying the voltage impulses provided by the Wiegand module 1100, and outputting [the voltage impulses] for charging the energy storage ES.

After a discontinuation of the outside energy supply, the energy storage ES may be initially charged completely and/or very strongly.

In the autonomous mode, the energy storage ES may supply the Hall elements HZ, the amplifiers V1/V2, the comparators K1 to K4, the data storages FD/NFD, and may be discharged in the autonomous mode by the corresponding energy requirement. As has been explained already, the Wiegand module 1100 may provide the voltage impulses, which may be used for charging the energy storage ES.

The determination of the value, which may indicate the number of repeating courses of movement (revolutions), may be effected similarly as in the non-autonomous mode by the evaluation of the output signals of the comparators.

What is different only, may be that the output signals of the first Hall elements HZ and thus of the comparators may be effected only then, if a voltage impulse of the Wiegand module is detected. The detection as to whether a voltage impulse is present or not is may be performed via a comparator K5.

As has been explained in detail in the preceding, the voltage impulse of the Wiegand module 1100 may be triggered as a function of the direction, in which the permanent magnet arrangement may move, if the north pole or the south pole of the permanent magnet arrangement is located at the first or at the second position. Thus, both the orientation of the permanent magnet arrangement and also its movement direction can be determined from the output signals of the comparators K1 to K4. Based on this, the value, which may indicate the number of the repeating courses of movement, may be determined, and may be stored in the volatile memory FD and/or the non-volatile memory NFD.

An output to the micro-controller 3100 may not occur in the autonomous mode.

(Combined Information by Means of Information from the Temporary Storage MZ)

With reference anew to FIG. 1, a possible case is discussed in the following, in which a rudimentary voltage impulse may occur.

If the permanent magnet 1201 is located in a starting posture, in which its longitudinal axis (north-south-axis) may be oriented parallel to the diagonal D1 and/or the longitudinal axis LAW of the Wiegand wire 1101, and if, starting from this starting posture, the permanent magnet 1201 moves in the clockwise direction, the triggering/generation of the voltage impulse may be effected, if the corresponding magnetic pole reaches the first position (Hall element B/b).

If, starting from this posture, the movement direction of the permanent magnet 1201 immediately reverses, i.e. the permanent magnet 1201 may move in the counter-clockwise direction, then a rudimentary voltage impulse may result, if the magnetic pole, which may formerly have been located at the first position (Hall element B/b), reaches the position, which may corresponds to the Hall element A/a and/or if the opposite magnetic pole reaches the second position (Hall element C/c).

The rudimentary voltage impulse may result in that the counting process, which would have to be performed in this posture, may not be correctly sensed, and in that the position sensor may have in its data storage only the information that the last counting process has been performed when the corresponding magnetic pole may have reached the first position (Hall element B/b). This error can be corrected upon occurrence of the next (non-rudimentary) voltage impulse.

If the magnetic pole, which may formerly be located at the position corresponding to the Hall element A/a, moves in the counter-clockwise direction so far that it may be located between the Hall elements d, c, and if the position sensor, in this posture, transitions to the non-autonomous mode, the combining of the value, which may indicate the number of the revolutions, with the precise posture of the permanent magnet 1201 cannot be performed without additional information.

This results in particular from the fact that in this posture, there may be no ambiguity (or clearness) about whether the magnetic pole may have moved to its current posture between the Hall element d and the Hall element c in the clockwise direction or in the counter-clockwise direction.

This ambiguity would have been restored, if the permanent magnet 1201 moved such far that the next voltage impulse occurs.

However, there may be applications, in which the combined information from the value, which may indicate the number of the revolutions, and the posture information about the precise posture may have to be available immediately after the position sensor may have transitioned into the non-autonomous mode, without having to wait for the next voltage impulse and/or to force the next voltage impulse.

As a solution to these problems, the magnetic temporary storage MZ and the Hall element HM, which may be arranged there below, may be provided in the position sensor according to the invention.

If, for example, after the occurrence of the rudimentary voltage impulse in the above described course of movements, the north pole may be located between the Hall elements d and c, then the information, which may be stored in the magnetic temporary storage MZ and/or the magnetization state of the temporary storage, may indicate inevitably that the south pole may have lastly come to pass the temporary storage MZ. Thus, by reading out the temporary storage, the processing electronic circuit may obtain the information that the north pole may have reached its current position in the counter-clockwise direction, and can unambiguously perform the combining of the value, which may indicate the number of the revolutions, with the posture information about the precise posture of the permanent magnet 1201.

If the magnetization state and/or the information, which may be stored in the temporary storage MZ, indicates that the north pole has lastly come to pass the temporary storage MZ, this may mean, that the north pole, starting from the first position, may have reached its current posture between the Hall elements d and c, in the clockwise direction. Also in this case, the combining of the value, which may indicate the number of the revolutions, with the posture information about the precise posture can be performed unambiguously.

In no case, it may be necessary to wait for the next voltage impulse or to execute an extensive synchronization routine, such as for example the supply with current of the coil that surrounds the Wiegand wire as described in EP 2 515 084.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. Position sensor for determining the number of repeating courses of movement of an object and the precise position of the object in relation to a reference position, wherein the position sensor comprises:
 a Wiegand module, which is composed of a Wiegand wire having a coil, which surrounds the Wiegand wire;
 a magnetic temporary storage, which is in addition to the Wiegand module;
 a first sensor element;
 a processing electronics circuit, which is configured to evaluate or to determine an output signal that is output from the first sensor element and an information that is stored in the magnetic temporary storage; and
 a permanent magnet arrangement, which is movable relatively to the Wiegand module in one direction and in a direction that is opposite to said one direction, wherein the permanent magnet arrangement is configured to be arranged at the object such that the permanent magnet arrangement performs the repeating courses of movement together with the object; wherein:
 upon movement of the permanent magnet arrangement in said one direction, the coil of the Wiegand module produces a voltage impulse, if a north pole or a south pole of the permanent magnet arrangement is located at a first position, and upon movement of the permanent magnet arrangement in said opposite direction, the coil of the Wiegand module produces the voltage impulse, if the north pole or the south pole of the permanent magnet arrangement is located at a second position that is different from the first position;
 upon movement of the permanent magnet arrangement, the magnetic poles of the permanent magnet arrangement come to pass the magnetic temporary storage such that the magnetic temporary storage stores information, which indicates whether the north pole or the south pole of the permanent magnet arrangement has lastly passed the magnetic temporary storage;
 in an autonomous mode, in which the position sensor is not supplied with outside energy, the processing electronic circuit is supplied with energy, which is provided by the Wiegand module;
 the processing electronic circuit is configured to, after the determining of the voltage impulse, which is output by the Wiegand module, determine a value, which corresponds to the number of repeating courses of movement of the permanent magnet arrangement, by the evaluation of the output signal of the first sensor element;
 in a non-autonomous mode, in which the position sensor is supplied with outside energy, the processing electronic circuit is further configured to continuously receive position information about the precise position of the permanent magnet arrangement in relation to the reference position, to combine the position information with the determined value, and to output the combined information, by the evaluation of the output signal of either the first sensor element or of a second sensor element that is different from the first sensor element; and
 if the outside energy supply is re-established again after a discontinuation, the combining of the position information with the determined value takes into consideration the information, which is stored in the magnetic temporary storage.

2. Position sensor according to claim 1, wherein the information, which is stored in the magnetic temporary storage, is stored as a single bit.

3. Position sensor according to claim 1, wherein the magnetic temporary storage is magnetized in one of two magnetization states as a function of whether the north pole or the south pole of the permanent magnet arrangement has lastly come to pass the magnetic temporary storage.

4. Position sensor according to claim 3, wherein the magnetic temporary storage is read out by a Hall element, which is connected to the processing electronic circuit.

5. Position sensor according to claim 1, wherein the magnetic temporary storage is a metal element.

6. Position sensor according to claim 5, wherein the material, from which the metal element is formed, has a residual magnetism, which is higher than that of the Wiegand wire.

7. Position sensor according to claim 1, wherein the processing electronics comprises the first sensor element, the second sensor element, the magnetic temporary storage, and a micro-controller for determining the position information.

8. Position sensor according to claim 1, wherein the first sensor element comprises a Hall element and wherein the second sensor element comprises at least one of: (i) an optical sensor element; (ii) an inductive sensor element; (iii) a capacitive sensor element; and (iv) a resistive sensor element.

* * * * *